US008375309B2

(12) United States Patent
Fioretti et al.

(10) Patent No.: US 8,375,309 B2
(45) Date of Patent: Feb. 12, 2013

(54) INTEGRATION OF COLLABORATION SYSTEMS IN AN INSTANT MESSAGING APPLICATION

(75) Inventors: Giuseppe Fioretti, Rome (IT); Sandro Piccinini, Rome (IT); Luigi Pichetti, Rome (IT); Marco Secchi, Rome (IT)

(73) Assignee: International Business Machines Corporation, Armonk, NY (US)

( * ) Notice: Subject to any disclaimer, the term of this patent is extended or adjusted under 35 U.S.C. 154(b) by 783 days.

(21) Appl. No.: 12/349,014

(22) Filed: Jan. 6, 2009

(65) Prior Publication Data

US 2010/0174999 A1 Jul. 8, 2010

(51) Int. Cl.
*G06F 3/00* (2006.01)
*G06F 15/16* (2006.01)

(52) U.S. Cl. ......... 715/753; 709/205; 709/206; 709/207

(58) Field of Classification Search .................. 715/753; 709/205–7

See application file for complete search history.

(56) References Cited

U.S. PATENT DOCUMENTS

| | | | | |
|---|---|---|---|---|
| 6,791,583 | B2 * | 9/2004 | Tang et al. | 715/751 |
| 6,832,245 | B1 * | 12/2004 | Isaacs et al. | 709/206 |
| 7,454,716 | B2 * | 11/2008 | Venolia | 715/853 |
| 2003/0131064 | A1 * | 7/2003 | Bell et al. | 709/206 |
| 2004/0078448 | A1 | 4/2004 | Malik et al. | |
| 2005/0166154 | A1 * | 7/2005 | Wilson et al. | 715/753 |
| 2005/0289470 | A1 * | 12/2005 | Pabla et al. | 715/753 |
| 2006/0031497 | A1 | 2/2006 | Beartusk et al. | |
| 2006/0059237 | A1 | 3/2006 | Wilcox | |
| 2006/0167991 | A1 | 7/2006 | Heikes et al. | |
| 2007/0022157 | A1 * | 1/2007 | Daniels et al. | 709/204 |
| 2007/0043822 | A1 | 2/2007 | Brumfield | |
| 2007/0174389 | A1 * | 7/2007 | Armstrong et al. | 709/204 |
| 2007/0271340 | A1 | 11/2007 | Goodman et al. | |
| 2007/0293206 | A1 * | 12/2007 | Lund | 709/206 |

* cited by examiner

*Primary Examiner* — Steven B. Theriault
*Assistant Examiner* — Dino Kujundzic
(74) *Attorney, Agent, or Firm* — DeLizio Gilliam, PLLC

(57) ABSTRACT

A user of an instant messaging application may interact with instant messaging contacts in other collaboration applications (e.g., e-mail, calendar applications, etc.). IM conversations may relate to information in the collaboration applications. For example, an employee may send an e-mail containing marketing data to his manager and wishes to discuss the data further. The employee sends an IM to the manager referencing the data. The manager should read the e-mail before responding, but the manager may not know that she received the e-mail. Information from a plurality of collaboration applications can be integrated into an instant messaging application. A collaboration integration unit can collect and associate information from the collaboration applications with instant messaging contacts and provide suggestions based on the information. In the previous example, the manager's instant messaging application collects information from an e-mail application and indicates that she has an unread e-mail from the employee.

16 Claims, 6 Drawing Sheets

US 8,375,309 B2

INTEGRATION OF COLLABORATION SYSTEMS IN AN INSTANT MESSAGING APPLICATION

BACKGROUND

Embodiments of the inventive subject matter generally relate to the field of instant messaging applications, and more particularly to integration of collaboration systems in an instant messaging application.

Instant messaging applications allow two or more users to communicate in real time by sending messages via standard internet protocol(s). Users may create contact lists of friends, family and business associates in the instant messaging application. The application allows the user to check if a certain contact is online and exchange messages with them. Instant messaging applications is rapidly becoming a preferred means of business collaboration because many instant messaging applications support voice conversations, file sharing, and text based chat.

SUMMARY

Embodiments include a method directed to retrieving information corresponding to a plurality of instant messaging contacts from one or more collaboration applications, where the plurality of instant messaging contacts are stored by an instant messaging application. A contact priority is determined for each of the plurality of instant messaging contacts based, at least in part, on the associated information. The priority can suggest a level of attention for each of the instant messaging contacts. A tip may be generated based on the contact priority, where the tip specifies a reason for the contact priority. An indication of the priority and the tip are displayed in an instant messaging contacts list.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences and computer program products that embody techniques of the present inventive subject matter. However, it is understood that the described embodiments may be practiced without these specific details. For instance, although examples refer to instant messaging applications, embodiments may be implemented in short message service (SMS) applications. In other instances, well-known instruction instances, protocols, structures and techniques have not been shown in detail in order not to obfuscate the description.

A user of an instant messaging application may interact with his or her instant messaging contacts in other collaboration applications (e.g., e-mail, online meeting applications, calendar applications, voicemail applications, etc.). Instant messaging conversations may relate to information in the other collaboration applications. For example, an employee may send an e-mail containing marketing data to his manager and wishes to discuss the data further. The employee may also send an instant message (IM) to the manager referencing the data. The manager should read the e-mail before responding to the IM, but the manager may not know that she received the e-mail.

Some embodiments can integrate information from a plurality of collaboration applications into an instant messaging application. For example, a collaboration integration unit can collect information from a plurality of collaboration applications and associate the information with instant messaging contacts and provide suggestions of based on the information. From the example above, the manager's instant messaging application can collect information from an e-mail application and display, to the manager, a tip indicating that she has an unread e-mail message from the employee.

Figure 1:
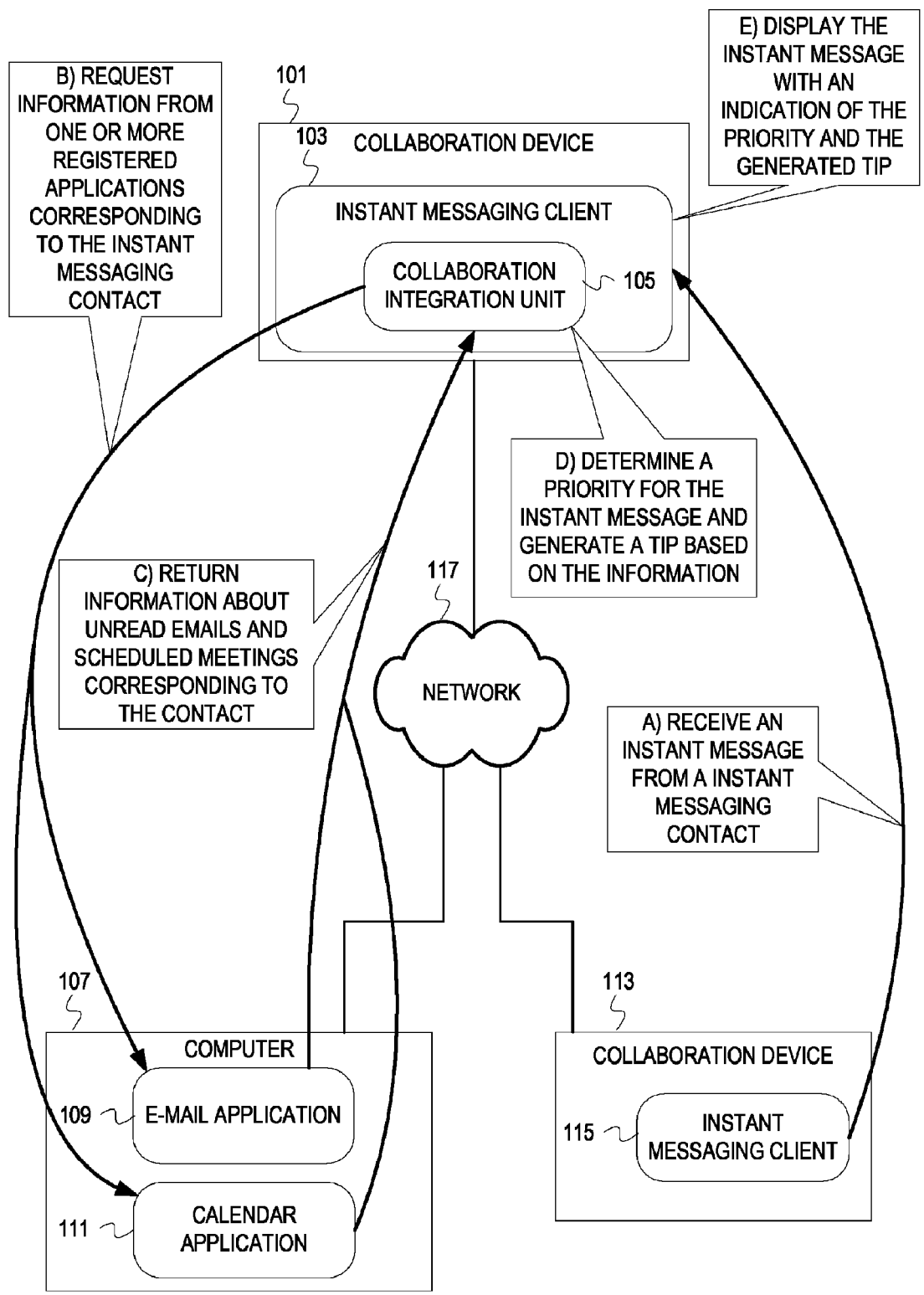
FIG. 1 is an example conceptual diagram of integrating information from collaboration applications into an instant messaging application.

FIG. 1 is an example conceptual diagram of integrating information from collaboration applications into an instant messaging application. In FIG. 1, two collaboration devices 101 and 113, and a computer 107 are connected to a network 117. The collaboration devices can include desktop computers, personal digital assistants (PDAs), mobile phones, etc. An instant messaging client 103 is running on the collaboration device 101. The instant messaging client 103 comprises a collaboration integration unit 105. An instant messaging client 115 is running on collaboration device 113. Although not shown, the instant messaging clients 103 and 115 include functionality for sending and receiving messages, displaying messages, managing instant messaging contacts, etc. An e-mail application 109 and a calendar application 111 are running on the computer 107.

At stage A, the instant messaging client 105 receives an instant message from an instant messaging contact logged into the instant messaging client 115.

At stage B, the collaboration integration unit 105 requests information from one or more registered applications corresponding to the instant messaging contact. The request may include identifying information associated with the instant messaging contact (e.g., a full name, an e-mail address, a phone number, etc.). A user registers an application with the collaboration integration unit 105 to indicate that information from the application should be integrated into the instant messaging client 103. When registering an application, a user may provide an application identifier, a username, a password, etc. For example, a user may provide an e-mail address, password, and mail server address to register an e-mail application. Examples of registered applications include an e-mail application, a calendar application, an online meeting application, a contact management application, etc. Although the registered applications are depicted as running on the computer 107, embodiments are not so limited. The registered applications may be running on the collaboration device 101 or on a server. In this example, the registered applications are the e-mail application 109 and the calendar application 111.

At stage C, the e-mail application 109 returns, to the collaboration integration unit 105, information about unread emails. Also, the calendar application 111 returns, to the collaboration integration unit 105, information about scheduled meetings corresponding to the instant messaging contact. The registered applications may return information corresponding to the contact. For example, the e-mail application 109 returns information about unread emails from the instant messaging contact (e.g., emails in which the instant messaging contact's email address is in the "from" field). The registered applications may return information corresponding to more than one contact. For example, the e-mail application 109 returns information about all unread e-mails. The collaboration integration unit 105 examines the information to determine if any of the information is associated with the instant messaging contact.

At stage D, the collaboration integration unit 105 determines a priority for the instant message and generates a tip based on the information. The priority indicates a suggested level of attention to be paid to an IM or an instant messaging contact. The tip can specify a reason for the priority. The tip may be generated from a tip template based on the information and the priority. The tip template may be stored locally and may be customized by a user. For example, an instant message is received from an instant messaging contact that a user is scheduled to meet in fifteen minutes. The collaboration integration unit 105 may determine a high priority for the instant message because the communication may be urgent in regard to the meeting. The collaboration integration unit 105 may generate a tip stating, "URGENT: You have a meeting with Contact X in fifteen minutes."

At stage E, the instant messaging client 103 displays the instant message with an indication of the priority and the tip. Priority may be indicated by a color scheme, a font effect (e.g., underline, bold, italics, etc.), a flashing banner, etc. The tip may be displayed in an IM window, in a mouse-over balloon, etc.

Figure 2:
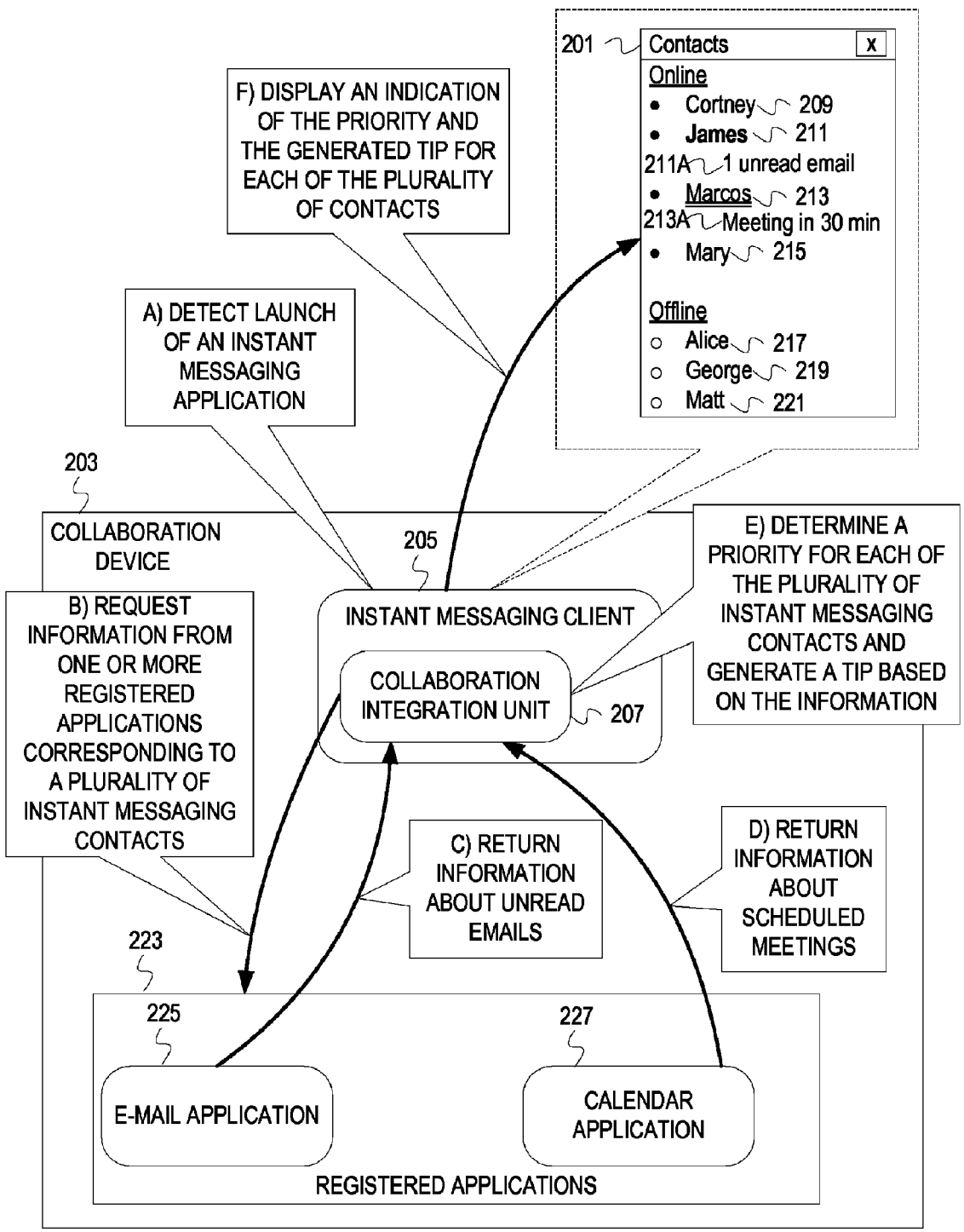
FIG. 2 is an example conceptual diagram of determining priorities of instant messaging contacts based on information from collaboration applications associated with the instant messaging contacts.

FIG. 2 is an example conceptual diagram of determining priorities of instant messaging contacts based on information from collaboration applications associated with the instant messaging contacts. In FIG. 2, an instant messaging client 205, an e-mail application 225 and a calendar application 227 are running on a collaboration device 203. The instant messaging client comprises a collaboration integration unit 207. The e-mail application 225 and the calendar application 227 comprise registered applications 223 of the collaboration integration unit 207.

At stage A, the instant messaging client 205 detects launch of an instant messaging application. For example, a user signs in to an instant messaging application.

At stage B, the collaboration integration unit 207 requests information from the registered applications 223 corresponding to a plurality of instant messaging contacts. In this example, there are seven instant messaging contacts, Cortney 209, James 211, Marcos 213, Mary 215, Alice 217, George 219, and Matt 221.

At stage C, the e-mail application 225 returns information about unread emails. In this example, the e-mail application 225 returns information about an unread e-mail from contact James 211.

At stage D, the calendar application 227 returns information about scheduled meetings. In this example, the calendar application 227 returns information about a meeting with contact Marcos 213.

At stage E, the collaboration integration unit 207 determines a priority for each of the instant messaging contacts and generates a tip based on the information. In this example, the collaboration integration unit 207 determines a high priority for the contact Marcos 213 and a medium priority for the contact James 211. The collaboration integration unit 207 generates a tip 211A, "1 unread email," for the contact James 211 and a tip 213, "Meeting in 30 min," for the contact Marcos 213.

At stage F, the instant messaging client 205 displays an indication of the priority and the tip for each of the plurality of contacts in a contacts list 201. In this example, the contact Marcos 213 is double underlined to indicate the high priority. The contact James 211 is bolded to indicate the medium priority. Priority may also be indicated by a color, flashing text, font size, etc. Contacts may also be arranged by priority in the contacts list 201. The tips 211A and 213A are displayed under the contacts James 211 and Marcos 213, respectively.

In some embodiments, a tip may contain a link to information in a collaboration application. For example, a tip indicating an unread messaged may contain a link to view the unread email. When the link is clicked, the email is displayed in the instant messaging application 205 or in the e-mail application 225.

Although examples refer to a collaboration integration unit requesting information from one or more registered applications, embodiments are not so limited. The collaboration integration unit may retrieve information from the registered applications by accessing data stored by the registered applications. For example, the collaboration integration unit retrieves information from a database maintained by a registered calendar application. As another example, the collaboration integration unit retrieves e-mail messages stored on a mail server of a registered e-mail application.

Figure 3:
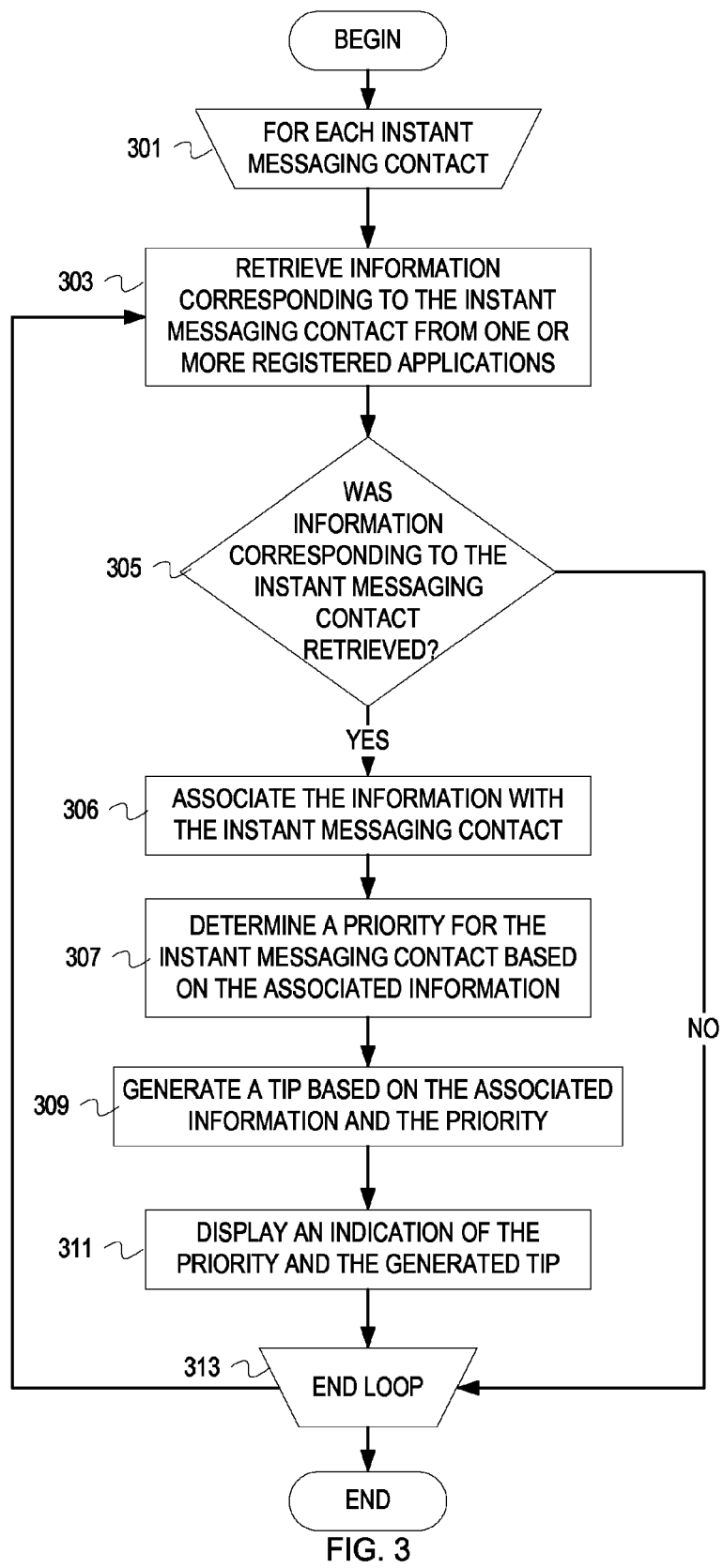
FIG. 3 is a flowchart depicting example operations for determining priorities of instant messaging contacts based on information from collaboration applications associated with the instant messaging contacts.

FIG. 3 is a flowchart depicting example operations for determining priorities of instant messaging contacts based on information from collaboration applications associated with the instant messaging contacts. At block 301, a loop begins for each instant messaging contact.

At block 303, a collaboration integration unit retrieves information corresponding to the instant messaging contact from one or more registered applications. For example, the collaboration integration unit retrieves information about meetings scheduled for today from a calendar database. The collaboration integration unit may also access a repository storing profile information of the instant messaging contact. The profile information may include the instant messaging contact's full name, a job title, a location, one or more e-mail addresses, a phone number, etc. The public information may be cached in an instant messaging client and used to associate retrieved data with the instant messaging contact. A user may also indicate profile information of the instant messaging contact.

At block 305, the collaboration integration unit determines if information corresponding to the instant messaging contact was retrieved. For example, the collaboration integration unit retrieves an email message. The collaboration integration unit determines that information corresponding to the instant messaging contact was retrieved if the instant messaging contact's name and/or email address is contained the email message. If information corresponding to the instant messaging contact was retrieved, flow continues at block 306. If information corresponding to the instant messaging contact was not retrieved, flow continues at block 313.

At block 306, the collaboration integration unit associates the information with the instant messaging contact.

At block 307, the collaboration integration unit determines a priority for the instant messaging contact based on the associated information. Priority may be influenced by other factors in addition to the associated information. For example, priority of a contact may be influenced by company rank. If two contacts have unread e-mail messages, the contact with a higher company rank would have a higher priority. As another example, a deadline may be approaching for a project, so a user adds instant messaging contacts on the project team to a list of important contacts.

At block 309, the collaboration integration unit generates a tip based on the associated information and the priority. For example, an instant messaging contact has a high priority because there is an unread urgent e-mail from the instant messaging contact and a meeting is scheduled for the contact in 30 minutes. The collaboration integration unit may generate a tip, "1 unread URGENT e-mail, meeting in 30 min."

At block 311, the collaboration integration unit displays an indication of the priority and the tip in a contacts list. In the above example, the priority can be indicated by displaying the instant messaging contact's name in flashing text. When a user hovers over the name with a mouse, the tip is displayed in a bubble. In addition to displaying the indication of the priority and the tip in the contacts list, the priority indication and tip may be displayed in an IM.

At block 313, the loop ends.

The flow in FIG. 3 can be executed when an instant messaging application is started and at certain intervals while the instant messaging application is running The interval may be specified by a user or may be a default value.

Figure 4:
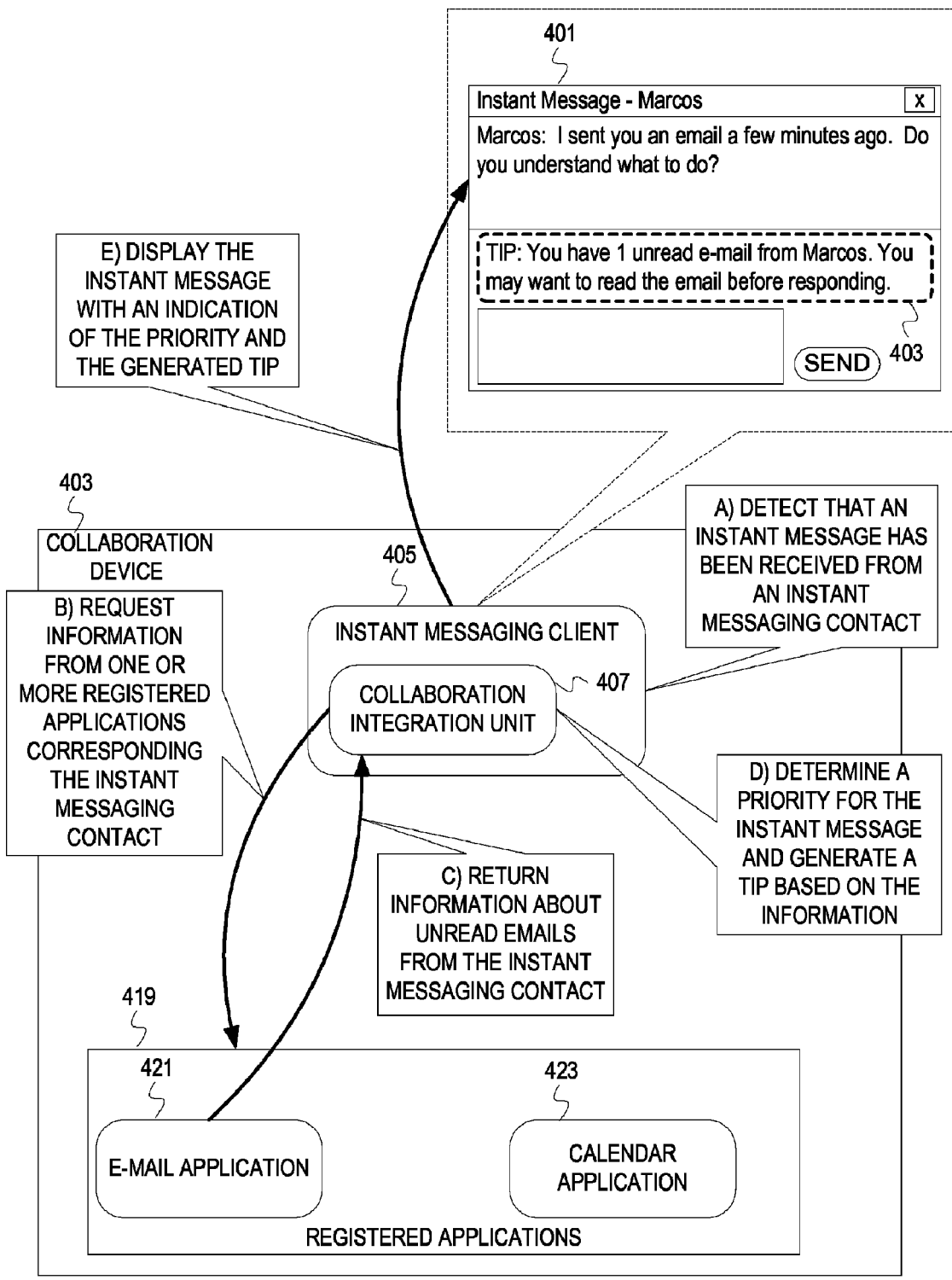
FIG. 4 is an example conceptual diagram of determining a priority of an IM based on information from collaboration applications associated with an instant messaging contact.

In addition to determining a priority for an instant messaging contact, a priority may be determined for an IM. FIG. 4 is an example conceptual diagram of determining a priority of an IM based on information from collaboration applications associated with an instant messaging contact. In FIG. 4, an instant messaging client 405, an e-mail application 421 and a calendar application 423 are running on a collaboration device 403. The instant messaging client comprises a collaboration integration unit 407. The e-mail application 421 and the calendar application 423 comprise registered applications 419 of the collaboration integration unit 407.

At stage A, the instant messaging client 405 detects that an IM 401 has been received from an instant messaging contact.

At stage B, the collaboration integration unit 407 requests information from registered applications 419 corresponding to the instant messaging contact.

At stage C, the e-mail application 421 returns information about unread emails from the instant messaging contact. In this example, there is one unread e-mail from the instant messaging contact.

At stage D, the collaboration integration unit 407 determines a priority for the instant message and generates a tip based on the information. In this example, the instant message is assigned a medium priority because there is an unread e-mail from the instant messaging contact. The priority suggests that the e-mail should be read before responding to the IM. The collaboration integration unit generates a tip from a tip template based on the priority. The generated tip states, "You have 1 unread e-mail from Marcos. You may want to read the email before responding."

At stage E, the instant messaging client displays the instant message with an indication of the priority and the generated tip. Priority may be indicated by a color scheme, flashing text, font effects (e.g., bold, italics, underline, etc.). The tip may be displayed in an IM window, a hover balloon, etc.

Figure 5:
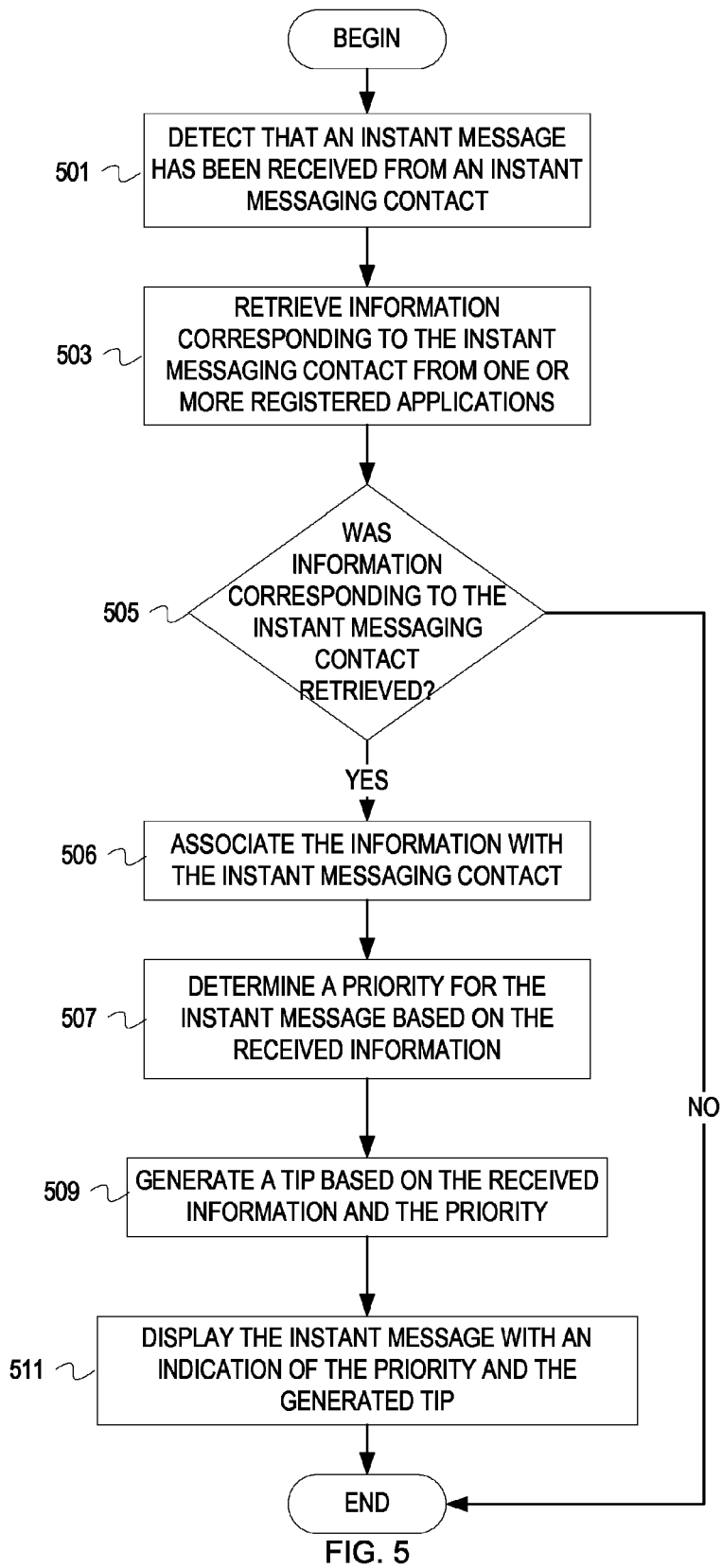
FIG. 5 is a flowchart depicting example operations for determining a priority of an IM based on information from collaboration applications associated with an instant messaging contact.

FIG. 5 is a flowchart depicting example operations for determining a priority of an IM based on information from collaboration applications associated with an instant messaging contact. Flow begins at block 501, where an instant messaging application detects than an IM has been received from an instant messaging contact.

At block 503, a collaboration integration unit retrieves information corresponding to the instant messaging contact from one or more registered applications. For example, the collaboration integration unit accesses profile information in a repository to determine the instant messaging contact's name and e-mail addresses. The collaboration integration unit then retrieves e-mail messages from a mail server. The collaboration integration unit examines the retrieved e-mail for the instant messaging contact's name and email addresses.

At block 505, the collaboration integration unit determines if information corresponding to the instant messaging contact was retrieved. In the above example, the collaboration integration unit determines that information corresponding to the instant messaging contact was retrieved if the instant messaging contact's name and/or email address is contained in one of the email messages. If information corresponding to the instant messaging contact was retrieved, flow continues at block 506. If information corresponding to the instant messaging contact was not retrieved, flow continues ends.

At block 506, the collaboration integration unit associates the information with the instant messaging contact.

At block 507, the collaboration integration unit determines a priority for the IM based on the associated information. For example, the collaboration integration unit determines a medium priority for the IM because there is one unread e-mail containing the instant messaging contact's name in the e-mail's message text.

At block 509, the collaboration integration unit generates a tip from a tip template based on the received information and the priority. In the above example, the tip states, "1 unread e-mail references Contact X. You may want to read the e-mail before responding."

At block 511, the instant messaging client displays the IM with an indication of the priority and the generated tip. For example, the priority is indicated by a red color scheme and the generated tip is displayed in a window of the IM. In addition to displaying the indication of the priority and the generated tip, the indication of the priority and generated tip may be displayed in a contacts list.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine readable medium includes any mechanism for storing ("machine-readable storage medium") or transmitting ("machine-readable transmission medium") information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, machine-readable transmission medium embodiments may be embodied in an electrical, optical, acoustical or other form of propagated signal (e.g., carrier waves, infrared signals, digital signals, etc.), or wireline, wireless, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 6:
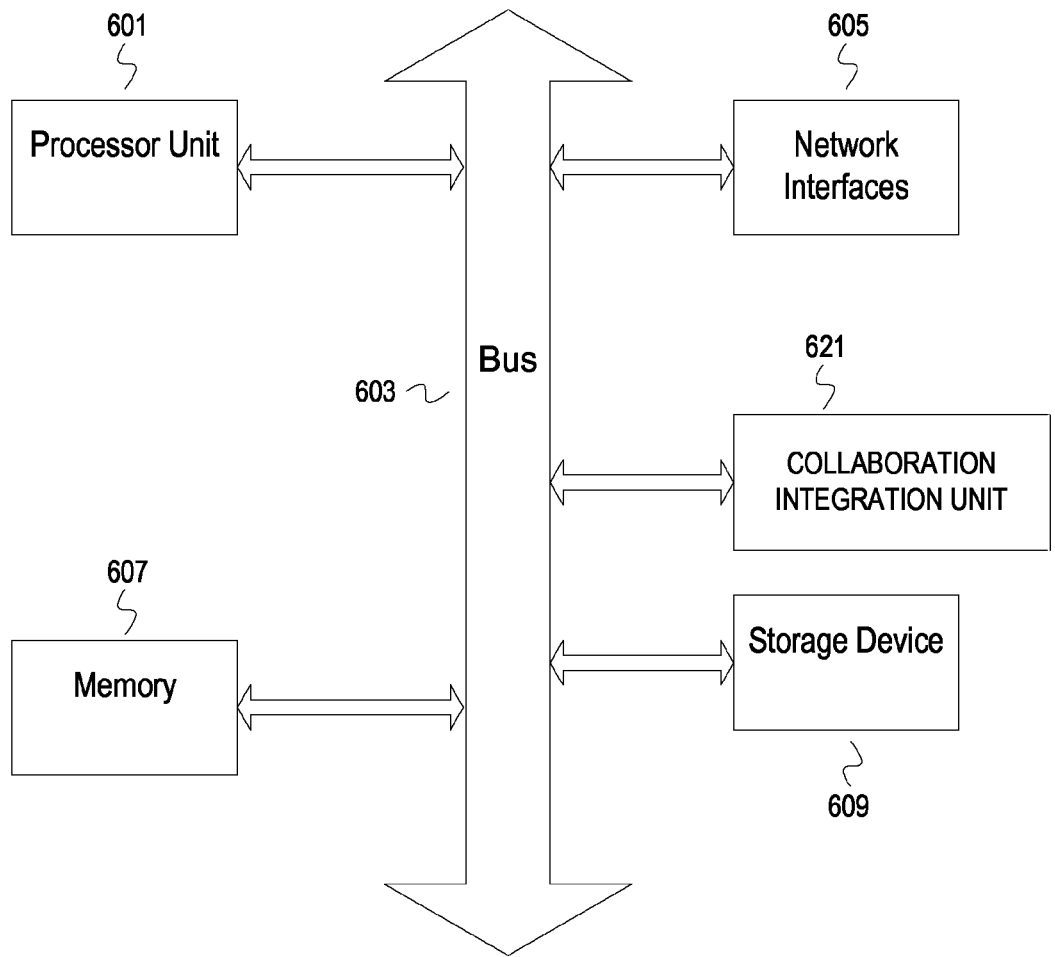
FIG. 6 depicts an example computer system.

FIG. 6 depicts an example computer system. A computer system includes a processor unit 601 (possibly including multiple processors, multiple cores, multiple nodes, and/or implementing multi-threading, etc.). The computer system includes memory 607. The memory 607 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 603 (e.g., PCI, ISA, PCI-Express, HyperTransport®, InfiniBand®, NuBus, etc.), a network interface 605 (e.g., an ATM interface, an Ethernet interface, a Frame Relay interface, SONET interface, wireless interface, etc.), and a storage device(s) 609 (e.g., optical storage, magnetic storage, etc.). The computer system also includes a collaboration integration unit 621 that retrieves information from a plurality of registered applications, associates the retrieved information with a plurality of instant messaging contacts, determines the priority of the instant messaging contacts based on the associated information and generates a tip based on the priority. Any one of these functionalities may be partially (or entirely) implemented in hardware and/or on the processing unit 601. For example, the functionality may be implemented with an application specific integrated circuit, in logic implemented in the processing unit 601, in a co-processor on a peripheral device or card, etc. Further, realizations may include fewer or additional components not illustrated in FIG. 6 (e.g., video cards, audio cards, additional network interfaces, peripheral devices, etc.). The processor unit 601, the storage device(s) 609, and the network interface 605 are coupled to the bus 603. Although illustrated as being coupled to the bus 603, the memory 607 may be coupled to the processor unit 601.

While the embodiments are described with reference to various implementations and exploitations, it will be understood that these embodiments are illustrative and that the scope of the inventive subject matter is not limited to them. In general, techniques for integration of collaboration systems in an instant messaging application as described herein may be implemented with facilities consistent with any hardware system or hardware systems. Many variations, modifications, additions, and improvements are possible.

Plural instances may be provided for components, operations or structures described herein as a single instance.

Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
receiving information corresponding to a plurality of instant messaging contacts from one or more collaboration applications, wherein the plurality of instant messaging contacts are stored by an instant messaging application, wherein the collaboration applications comprise an e-mail application, a calendar application, an online meeting application, and a voicemail application;
associating the information with the instant messaging contacts;
determining a contact priority for each of the instant messaging contacts based, at least in part, on the association between the information and the instant messaging contacts, wherein the contact priority indicates an attention level associated with each of the instant messaging contacts;
generating a contact tip based, at least in part, on the contact priority, wherein the contact tip specifies a reason for the contact priority; and
displaying an indication of the contact priority and the contact tip in an instant messaging contacts list;
detecting that an instant message has been received from one of the instant messaging contacts;
receiving, from the one or more collaboration applications, contact information corresponding to the instant messaging contact;
associating the contact information with the instant messaging contact, wherein the contact information comprises contact priority;
determining a message priority for the instant message based, at least in part, on the association between the corresponding contact priority and the instant messaging contact, wherein the message priority indicates an attention level for the instant message;
generating a message tip based, at least in part, on the message priority, wherein the message tip specifies a reason for the message priority and suggests an action based on the message priority; and
displaying the instant message with an indication of the message priority and the message tip.

2. The method of claim 1, wherein said receiving information corresponding to the plurality of instant messaging contacts from the one or more collaboration applications further comprises at least one of requesting information from the one or more collaboration applications, and accessing data stored by the one or more collaboration applications.

3. The method of claim 1, wherein determining a contact priority for each of the instant messaging contacts includes determining the contact priority in accordance with a read status of an email from an instant messaging contact.

4. The method of claim 1, wherein determining a contact priority for each of the instant messaging contacts includes determining the contact priority in accordance with a project deadline for a project including the instant messaging contact.

5. The method of claim 1, wherein determining a contact priority for each of the instant messaging contacts includes determining the contact priority in accordance with a calendar event associated with the instant messaging contact.

6. The method of claim 1, wherein said associating the information with the instant messaging contacts further comprises retrieving profile information of the instant messaging contacts from a profile repository, wherein the profile information comprises at least one of a full name, an e-mail address, a phone number, a job title, and a location.

7. The method of claim 6, further comprising searching the information for profile information of the instant messaging contacts.

8. The method of claim 1 further comprising:
  detecting user selection of a link in the contact tip; and
  displaying the associated information in at least one of the instant messaging application and one of the one or more collaboration applications.

9. The method of claim 1, wherein the indication of the priority is at least one of a color scheme, a font effect, a font size, and flashing text.

10. One or more machine-readable storage media having stored therein a program product, which when executed by a set of one or more processor units causes the set of one or more processor units to perform operations that comprise:
  receiving information corresponding to a plurality of instant messaging contacts from one or more collaboration applications, wherein the plurality of instant messaging contacts are stored by an instant messaging application, wherein the collaboration applications comprise an e-mail application, a calendar application, an online meeting application, and a voicemail application;
  associating the information with the instant messaging contacts;
  determining a contact priority for each of the instant messaging contacts based, at least in part, on the association between the information and the instant messaging contacts, wherein the contact priority indicates an attention level associated with each of the instant messaging contacts;
  generating a contact tip based, at least in part, on the contact priority, wherein the contact tip specifies a reason for the contact priority; and
  displaying an indication of the contact priority and the contact tip in an instant messaging contacts list;
  detecting that an instant message has been received from one of the instant messaging contacts;
  receiving, from the one or more collaboration applications, contact information corresponding to the instant messaging contact;
  associating the contact information with the instant messaging contact, wherein the contact information comprises contact priority;
  determining a message priority for the instant message based, at least in part, on the association between the corresponding contact priority and the instant messaging contact, wherein the message priority indicates an attention level for the instant message;
  generating a message tip based, at least in part, on the message priority, wherein the message tip specifies a reason for the message priority and suggests an action based on the message priority; and
  displaying the instant message with an indication of the message priority and the message tip.

11. The machine-readable storage media of claim 10, wherein said receiving information corresponding to the plurality of instant messaging contacts from the one or more collaboration applications further comprises at least one of requesting information from the one or more collaboration applications, and accessing data stored by the one or more collaboration applications.

12. The machine-readable storage media of claim 10, wherein said associating the information with the instant messaging contacts further comprises retrieving profile information of the instant messaging contacts from a profile repository, wherein the profile information comprises at least one of a full name, an e-mail address, a phone number, a job title, and a location.

13. The machine-readable storage media of claim 12, wherein the operations further comprise searching the information for profile information of the instant messaging contacts.

14. The machine-readable storage media of claim 10, wherein the operations further comprise:
  detecting user selection of a link in the contact tip; and
  displaying the associated information in at least one of the instant messaging application and one of the one or more collaboration applications.

15. The machine-readable storage media of claim 10, wherein the indication of the priority is at least one of a color scheme, a font effect, a font size, and flashing text.

16. An apparatus comprising:
  a set of one or more hardware processing units;
  a network interface; and
  a collaboration integration unit executable by at least one of the set of one or more hardware processing units and configured to,
    receive information corresponding to a plurality of instant messaging contacts from one or more collaboration applications, wherein the plurality of instant messaging contacts are stored by an instant messaging application, wherein the collaboration applications comprise an e-mail application, a calendar application, an online meeting application, and a voicemail application;
    associate the information with the instant messaging contacts;
    determine a contact priority for each of the instant messaging contacts based, at least in part, on the association between the information and the instant messaging contacts, wherein the contact priority indicates an attention level associated with each of the instant messaging contacts;
    generate a contact tip based, at least in part, on the contact priority, wherein the contact tip specifies a reason for the contact priority; and
    display an indication of the contact priority and the contact tip in an instant messaging contacts list;
    detect that an instant message has been received from one of the instant messaging contacts;
    receive, from the one or more collaboration applications, contact information corresponding to the instant messaging contact;
    associate the contact information with the instant messaging contact, wherein the contact information comprises contact priority;
    determine a message priority for the instant message based, at least in part, on the association between the corresponding contact priority and the instant messaging contact, wherein the message priority indicates an attention level for the instant message;
    generate a message tip based, at least in part, on the message priority, wherein the message tip specifies a reason for the message priority and suggests an action based on the message priority; and
    display the instant message with an indication of the message priority and the message tip.

* * * * *